US010395300B2

(12) United States Patent
Chong et al.

(10) Patent No.: US 10,395,300 B2
(45) Date of Patent: Aug. 27, 2019

(54) METHOD SYSTEM AND MEDIUM FOR PERSONALIZED EXPERT COSMETICS RECOMMENDATION USING HYPERSPECTRAL IMAGING

(71) Applicant: International Business Machines Corporation, Armonk, NY (US)

(72) Inventors: Wendy Chong, Carmel, NY (US); Levente Klein, Tuckahoe, NY (US); James R. Kozloski, New Fairfield, CT (US); John J. Rice, Mohegan Lake, NY (US); Pablo Meyer Rojas, Brooklyn, NY (US); Alejandro Gabriel Schrott, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 14/976,330

(22) Filed: Dec. 21, 2015

(65) Prior Publication Data

US 2017/0178220 A1 Jun. 22, 2017

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06K 9/00268* (2013.01); *G06Q 50/01* (2013.01); *G06K 2009/4657* (2013.01)

(58) Field of Classification Search
CPC .......................... G06Q 30/0631; G06Q 50/01; G06K 9/00013
(Continued)

(56) References Cited

U.S. PATENT DOCUMENTS 6,516,245 B1 2/2003 Dirksing et al.
7,437,344 B2 10/2008 Peyrelevade
(Continued)

FOREIGN PATENT DOCUMENTS

WO 2001091601 12/2001

OTHER PUBLICATIONS

Digital Image Processing: Clinical Applications and Challenges in Cosmetics (Year: 2015).*
(Continued)

*Primary Examiner* — Jeffrey A. Smith
*Assistant Examiner* — Lalith M Duraisamygurusamy
(74) *Attorney, Agent, or Firm* — Fleit Gibbons Gutman Bongini Bianco PL; Donna Flores

(57) ABSTRACT

Various embodiments provide a customized cosmetics recommendation for a specific user. In one embodiment a method comprises capturing an image that includes the face of the specific user, producing a set of hyperspectral images from the image, analyzing the hyperspectral images to determine a set of spectral components of the face, and providing a recommendation for one or more cosmetics customized for the specific user based on the set of spectral components and cosmetician expert judgement. The image may be captured using a hyperspectral imaging camera. The set of spectral components is compared to a plurality of previous sets of spectral components to find a match and one or more cosmetics mapped to the match are provided as the recommendation. Additionally, a set of conditional options may be received and one or more cosmetics mapped to the set of conditional options and the set of spectral components are provided as the recommendation.

19 Claims, 6 Drawing Sheets

(51) Int. Cl.
*G06Q 50/00* (2012.01)
*G06K 9/00* (2006.01)
*G06K 9/46* (2006.01)

(58) Field of Classification Search
USPC .......................................................... 703/26.7
See application file for complete search history.

(56) References Cited

U.S. PATENT DOCUMENTS

| | | | | | |
|---|---|---|---|---|---|
| 7,778,926 | B1 * | 8/2010 | Grinchenko | G06Q 30/018 | 705/50 |
| 8,170,918 | B2 | 5/2012 | Gomez | | |
| 8,634,640 | B2 | 1/2014 | Bhatti et al. | | |
| 2008/0194928 | A1 * | 8/2008 | Bandic | G16H 15/00 | 600/306 |
| 2008/0270175 | A1 | 10/2008 | Rodriguez et al. | | |
| 2009/0245603 | A1 * | 10/2009 | Koruga | A45D 44/00 | 382/128 |
| 2012/0321759 | A1 | 12/2012 | Marinkovich et al. | | |
| 2013/0145272 | A1 * | 6/2013 | Boggie | G06F 3/0487 | 715/728 |
| 2014/0213909 | A1 | 7/2014 | Mestha et al. | | |
| 2014/0314315 | A1 | 10/2014 | Chhibber et al. | | |
| 2014/0354996 | A1 * | 12/2014 | Fontecchio | G02F 1/13342 | 356/416 |
| 2015/0044098 | A1 * | 2/2015 | Smart | A61B 5/0013 | 422/82.05 |
| 2015/0356661 | A1 * | 12/2015 | Rousay | G06Q 30/0631 | 705/26.7 |
| 2016/0086380 | A1 * | 3/2016 | Vayser | G02B 27/0172 | 345/633 |
| 2017/0119130 | A1 * | 5/2017 | Witchell | A45D 44/005 | |

OTHER PUBLICATIONS

Siitan, K., “Consumer Behavior and the Influence of In-store Factors on Consumption of Natural Beauty Care Products in the Estonian Market”, Helsinki Metropolia University of Applied Sciences, Bachelor of Business Administration European Management Thesis, Apr. 15, 2015, pp. 1-52.

Xiao, K., “Skin Colour Database”, Report for CIE R1-56, Nov. 5, 2012, pp. 1-12.

Covergirl, “Embrace Your Face”, https://www.covergirlfablab.com/, last visited on Oct. 19, 2015, p. 1.

X-Rite,“Online Color Challenge”, http://www.xrite.com/online-color-test-challenge, last visited on Oct. 19, 2015, pp. 1-2.

* cited by examiner

METHOD SYSTEM AND MEDIUM FOR PERSONALIZED EXPERT COSMETICS RECOMMENDATION USING HYPERSPECTRAL IMAGING

BACKGROUND

The present disclosure generally relates to hyperspectral imaging, and more particularly relates to using hyperspectral imaging to analyze skin tones and recommend cosmetics.

The cosmetics industry has devoted considerable time and effort to the design of products targeted to distinct skin and hair colors. The considerable amount of investment and the research and development by these companies has yielded a broad range of product choices aimed at satisfying the diversity of the customer base. Choosing the right color combination is a daunting task for the average consumer and an on-demand expert currently may not be economical nor feasible. Moreover, a cosmetic choice identified for a given consumer is for a fixed moment in time and is not customized based on environmental or temporal factors.

BRIEF SUMMARY

In one embodiment, a method for providing a customized cosmetics recommendation is disclosed. The method comprises capturing an image including a face of a specific user, producing a set of hyperspectral images from the image, analyzing the hyperspectral images to determine a set of spectral components of the face, and providing a recommendation for one or more cosmetics customized for the specific user based on the set of spectral components and cosmetician expert judgement.

In another embodiment, an information processing system is disclosed. The information processing system comprises memory and a processor that is operably coupled to the memory. The information processing system further comprises a recommendation engine operably coupled to the memory and the processor. The recommendation engine is configured to perform a method comprising capturing an image including a face of a specific user, producing a set of hyperspectral images from the image, analyzing the hyperspectral images to determine a set of spectral components of the face, and providing a recommendation for one or more cosmetics customized for the specific user based on the set of spectral components and cosmetician expert judgement.

In yet another embodiment, a computer program product for providing a customized cosmetics recommendation is disclosed. The computer program product comprises a storage medium readable by a processing circuit and storing instructions for execution by the processing circuit for performing a method. The method comprises capturing an image including a face of a specific user, producing a set of hyperspectral images from the image, analyzing the hyperspectral images to determine a set of spectral components of the face, and providing a recommendation for one or more cosmetics customized for the specific user based on the set of spectral components and cosmetician expert judgement.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

In this disclosure, a method is presented that utilizes the power of hyperspectral imaging (HSI) technology to generate a conduit of a large array of data to a cognitive computing environment to generate rules for producing customized cosmetic product recommendations at the individual level on demand. The terms "cosmetics," "cosmetic products" and "make-up" are used interchangeably within this disclosure.

Operating Environment

Figure 1:
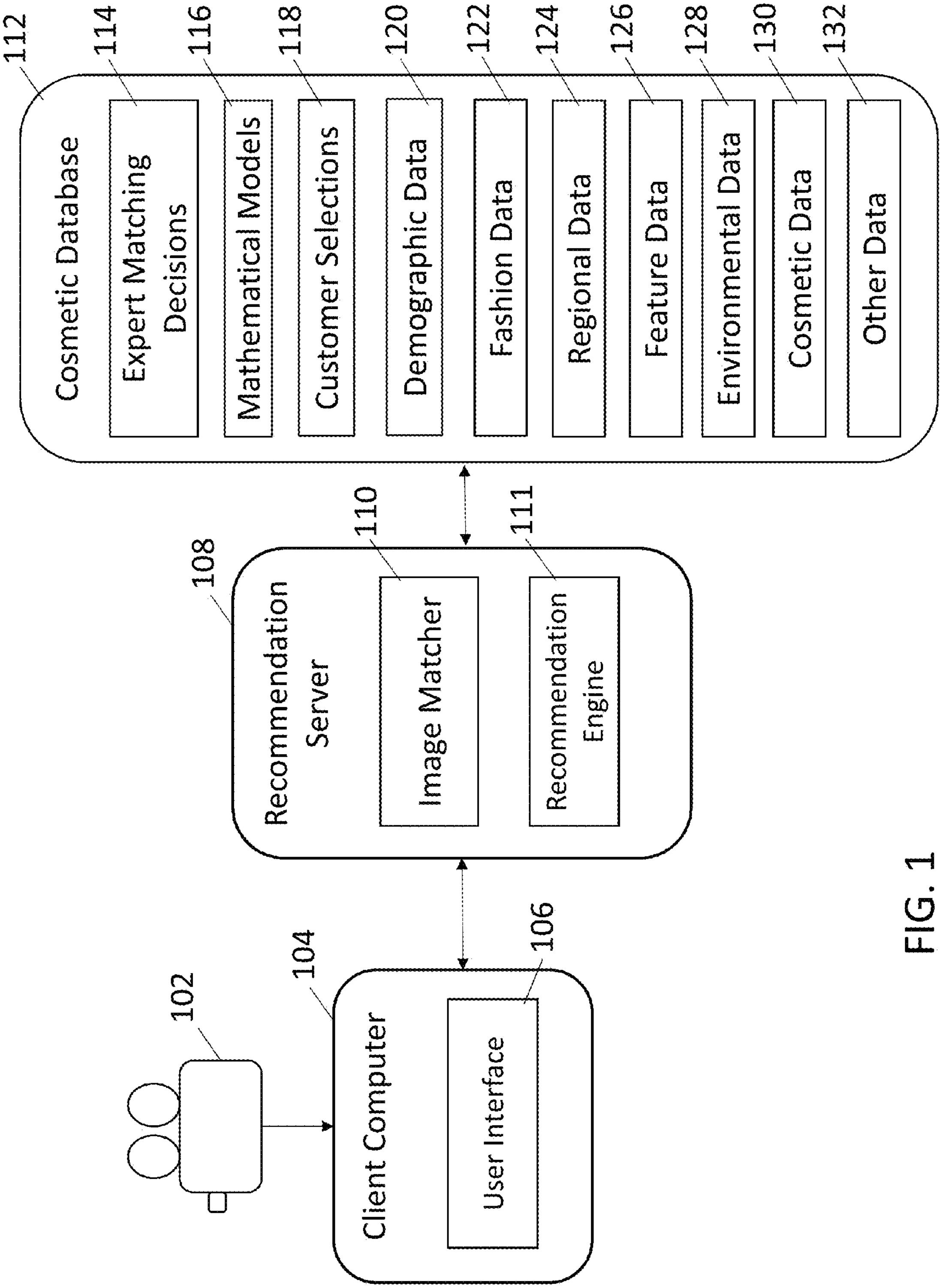
FIG. 1 is a block diagram of an example operating environment for a cosmetics recommendation system using hyperspectral imaging according to one embodiment of the present disclosure.

FIG. 1 shows one example of an operating environment for a cosmetics recommendation system 100 using hyperspectral imaging according to one embodiment of the disclosure. The operating environment is based on new developments in hyperspectral imaging (HSI) cameras 102 which, due to versatility and low cost, can provide application in the consumer market. A person's perception of colors is a subjective process whereby the brain responds to stimuli produced when incoming light reacts with the different types of cone photoreceptors in the eye. As such, different people may see the same illuminated object or light source in different ways. The cosmetics recommendation system 100 assists a user in making decisions about colors and application techniques based on the context of their face and the perceptual apparatus of a cosmetician whose expert input has been formalized in the system and by which the color will emerge as a subjective experience or quality of consciousness. The system maps:

1. Components of the face
2. Components of an expert cosmetician's perceptual apparatus
3. Components of the viewer's cognitive context to:

1. The mixture of wavelengths corresponding to a cosmetician's desired color
2. The mixture of cosmetics corresponding to a desired wavelength of light sufficient to produce the cosmetician's desired color
3. The application techniques for cosmetics necessary to provide additional context for the subjective experience to emerge The use of hyperspectral imaging has been pioneered by satellite imaging and has been allowing atmospheric characterization based on analysis of the spectral components of the reflected sun light by the earth's surface. Concepts of hyperspectral imaging are applied herein to intelligently recommend cosmetic products customized for a particular user.

The cosmetics recommendation system 100 maps measures of the face to which cosmetics will be applied, an expert cosmetician's perception of different colors, and the cognitive context of the viewer (usually the customer), into the space of desired colors recommended by the cosmetician and then into the space of pigments specifically chosen to produce this color in the targeted cognitive and environmental context. Because the number of measures far exceed the number of observed percepts or preferences of any given user, a method is proposed which performs sparse regression (LASSO) from measures into a standard color space such as a color wheel, targeting these colors with cosmetics that the system learns are capable of generating the cosmetician's desired color in the environment.

The example cosmetics recommendation system 100 comprises one or more HSI cameras 102 to capture a hyperspectral and structural image at a customer accessible location (e.g., cosmetic counters in department stores). The HSI camera 102 produces an array of images of an object, which in most cases, is a facial portrait of a particular customer. The images may be transferred to a client computer 104 which may include a user interface 106 for collecting customer information from the customer (e.g., personal history, personal cosmetic favorites, event and location descriptions, preferred color of clothing for the event, etc.) and displaying a simulation image illustrating the application of the cosmetics in the image. The simulated image portrays the effect of using the selected cosmetic product, including direct and mirror image pictures to promote costumer confidence in the predicted appearance. Images may be created for specific environments or events, such as a concert hall where illumination, settings and other patrons may be visualized in a mockup setting such that the impact of the recommended cosmetics may be quantified based on the surroundings.

Color choices for make-up best suited for the customer can be made based on predicted best color on one or more criteria, such as matching a cosmetic database 112 containing a multiset of expert generated decisions, objective measures based on mathematical models for prevailing principles of color matching in cosmetics and clothes, past purchases and associated satisfaction levels, pooled data from other customers similar in appearance or other demographics, colors that align better with the prevailing fashion, colors that reflect regional preferences, colors that may concentrate a personal vision on a certain features, like eye or chin of the person wearing the make-up, intended lighting and environment for which the product will be used, and the expected time the make-up should remain intact. The color matching can also minimize the variance in a certain spectral bands where skin color and applied makeup will blend to minimize contrast or it could increase contrast in some parts of the face, like eye, where high difference is achieved between eyes and face color.

The client computer 104 sends the images and customer information to the recommendation server 108 via a wired or wireless network. The recommendation server 108 comprises an image matcher 110 and a recommendation engine 111 which access a cosmetic database 112 containing historical data including expert matching decisions 114, mathematical models 116, customer selections 118, demographic data 120, fashion data 122, regional data 124, feature data 126, environmental data 128, cosmetic data 130 and any other relevant data 132. The image matcher 110 matches the information received from the client computer 104 to the historical data from the cosmetic database 112 and the recommendation engine 111 recommends a particular cosmetic or set of cosmetics to the customer based on the images taken with the HIS camera 102 and the customer information provided. In some embodiments, the cosmetic database 112 may be located within the recommendation server 108. In other embodiments, the cosmetic database 112 may be located remotely.

The expert matching decisions 114 include details of past cosmetic recommendations from cosmetician experts based upon an historical sampling of images acquired from a variety of sources. The expert matching decisions 114 may also include measures of the expert cosmetician's color discrimination and perception.

The mathematical models 116 may be used to apply color matching principles to HSI images captured with the HSI camera 102 to obtain objective best match results.

Customer selections 118 may include measures of the user's cognitive context including historical data of the particular customer's past purchases and interests (e.g., purchase history of, or interest in, art and design goods, music, reading, etc.), favorite brands, cosmetics for which the customer has a personal aversion or dislike, personal allergens, "wish list" cosmetics, etc.

Demographic data 120 may include details of best matches or favorite cosmetics of prior customers/test subjects with similar factors such as age, ethnicity, etc.

Fashion data 122 may include information concerning current trends in fashion styles and cosmetics currently associated with such styles. Fashion data 122 may change according to season.

Regional data 124 may include cosmetics commonly recommended for a particular region, such as cosmetics having a sunscreen element in warm, tropical areas, or those having a moisturizing component in cold or dry areas. Regional data 124 may also include information indicating a general preference for a certain brand or specific make-up in a particular area.

Feature data 126 may include data for specific cosmetics that enhance or downplay a particular facial feature. For example, if the customer indicates that she would like to enhance her eyes, the feature data 126 may indicate specific cosmetics that have been determined to enhance or draw attention to a particular eye color or shape.

Environmental data 128 may include information regarding recommended cosmetics based on factors associated with specific events, such as lighting (e.g., natural or artificial, lighting level, etc.), degree of event formality (e.g., wedding, award ceremony, picnic, business meeting, etc.), indoor/outdoor setting, time of day, time of year, etc.

Cosmetic data 130 may include information related to specific cosmetics, such as the brands and shades carried by a retailer where the cosmetics recommendation system is installed, current inventory, ingredients of each cosmetic, etc. Cosmetic data 130 may include data for cosmetic products originating from a number of different vendors. Other data 132 includes any other data that may be relevant in providing a recommendation for a particular customer.

Figure 2:
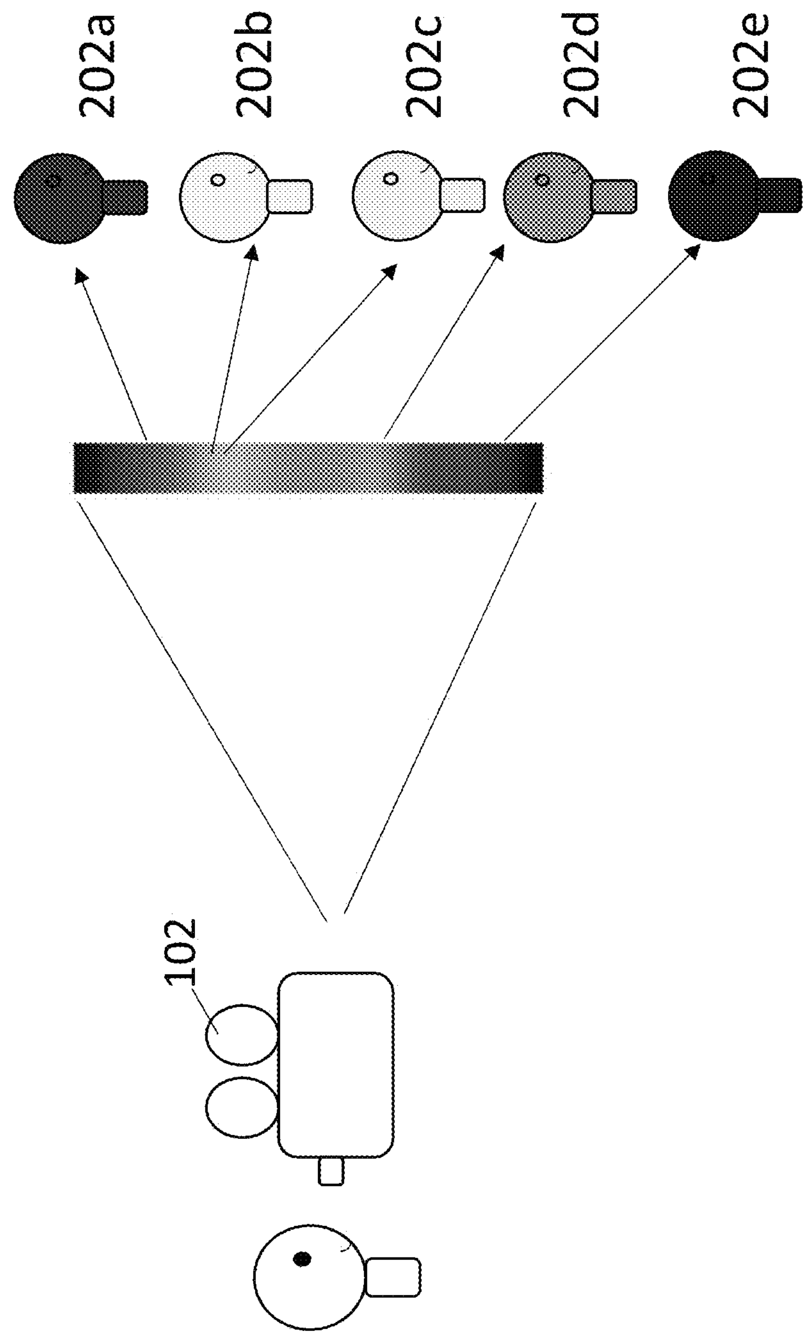
FIG. 2 is a pictorial diagram illustrating one example of a hyperspectral camera operating according to one embodiment of the present disclosure.

As shown in FIG. 2, a HSI camera 102 provides a plurality of images 202*a*, 202*b*, 202*c*, 202*d*, 202*e* (referenced collectively as image 202) of an object 204, where each image 202 is a wavelength filtered version of the incoming luminous information so that the image 202 contains only the spectral components of the object 204 comprised in a narrow wavelength interval, where the full width at half maximum (FWHM) wavelength is typically 4-15 nm. Although FIG. 2 is presented in grayscale, one skilled in the art would understand that the illustration is meant to represent the color spectrum. Recent snap-shot type cameras provide sufficient spatial pixel arrays (e.g., about 250×250 pixels) and a plurality of about 20-25 different filters. By using one of these cameras 102, the HSI platform is able to instantly produce a "hypercube" of 20-25 different portraits of the same human face, each portraying a narrow spectral information of that face. This hypercube information can be easily extracted using the appropriate software for analytics purposes.

Additional embodiments for a mobile platform which, mediated by the use of an ID, allows the customer to access the analysis and diagnostic results through a cellular phone for immediate advice based on stored costumer information and incidental picture taken and sent by the cellular phone.

Data Acquisition Phase

Figure 3:
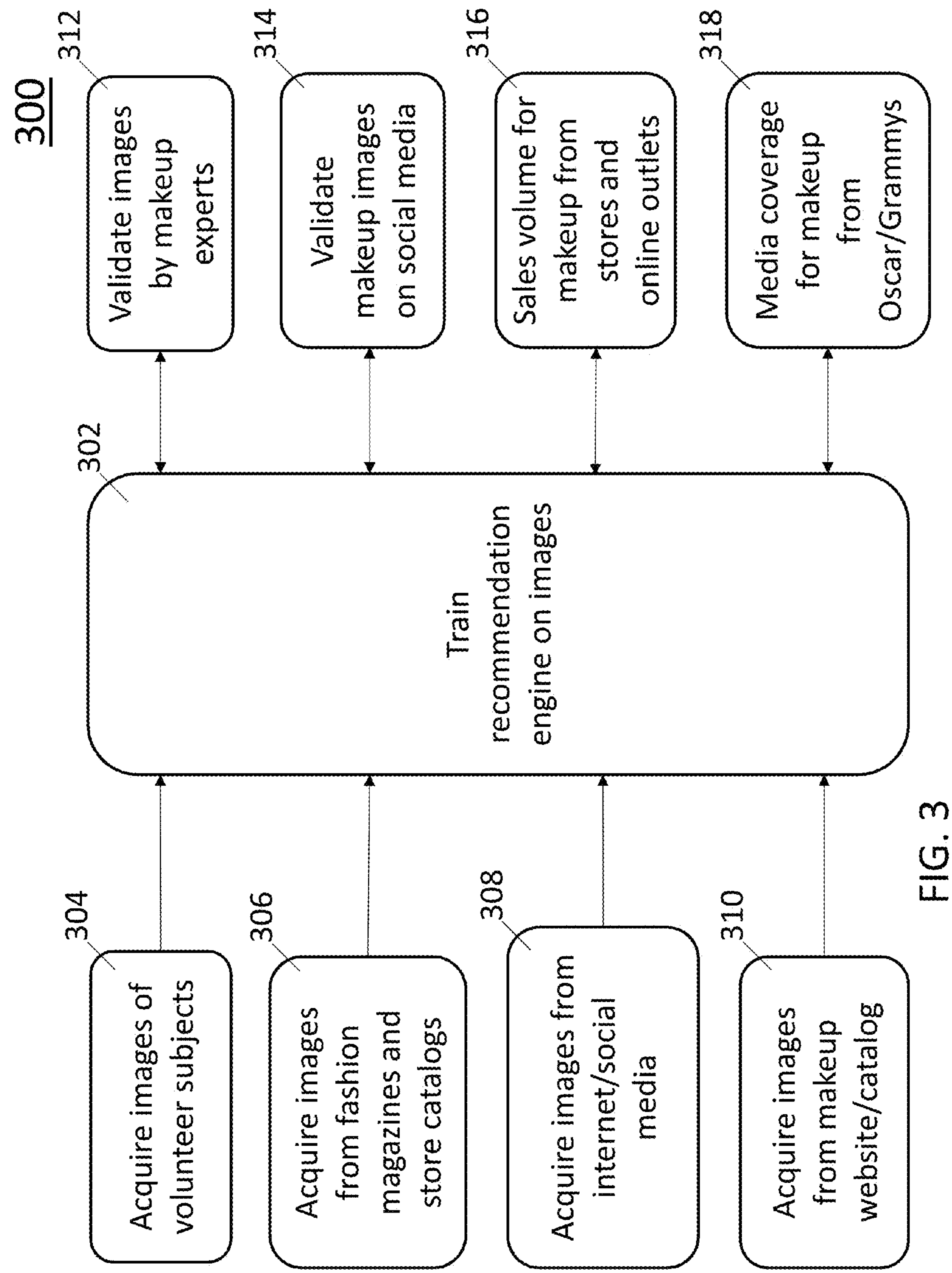
FIG. 3 is an operational flow diagram illustrating one process of training a neural network on images according to one embodiment of the present disclosure.

Turning now to FIG. 3, an operational flow diagram 300 is provided illustrating an example data acquisition phase for the cosmetics recommendation system 100. The data acquisition phase allows for training the recommendation engine, at step 302, to match original images acquired from a HSI camera 102 using the array of spectral images and their associated layers of data to specific cosmetics using the information contained in the cosmetic database 112. Skin color analyses is performed on a variety of input images. For example, at step 304, images are acquired from trial volunteers utilizing a hyper spectral camera system. These images may include HSI images of test subjects prior to application of make-up, after application of a variety of specific cosmetic shades and/or brands and under various illumination conditions. Additionally, images may be acquired, at step 306, and from scanning high quality facial pictures from catalogs such as fashion and store catalogs and analyzing the spectral images. Other input source may include, at step 308, acquiring images of various people, including the aforementioned test subjects, from the internet and social media outlets, such as FACEBOOK™ INSTRAGRAM™, TWITTER™, etc. Additional images may be obtained, at step 310, from cosmetic manufacturers either directly, such as from a website, or by scanning make-up catalogs using a HSI camera 102.

Make-up experts evaluate and validate the images, at step 312, of the volunteer test subjects including application of best, chosen, and available products. The experts may assign an optimum make-up and additional favorable colors based on their expert opinion derived from interview or professionally acquired color pictures. Additional validation data may be considered during the data acquisition phase by polling social media opinions, at step 314, to prioritize make-up selection according to public opinion. Objective data, such as sales volumes for particular brands and shades, may be obtained from retail stores and online outlets, at step 316, and used to train the recommendation engine 111. Other training data may include cosmetic information from media coverage regarding make-up used by celebrities at prime events, such as award shows like the Oscars, Grammys, etc.

Additional images taken after make-up is applied, along with recording of color spectrum and facial expressions, may be used to fine tune the training. A set of images on a large group of people where specific cosmetics can be identified and rated by an expert for matching and first impression (e.g., using a surprise factor rating) are particularly beneficial for training purposes.

Cognitive Phase

Figure 4:
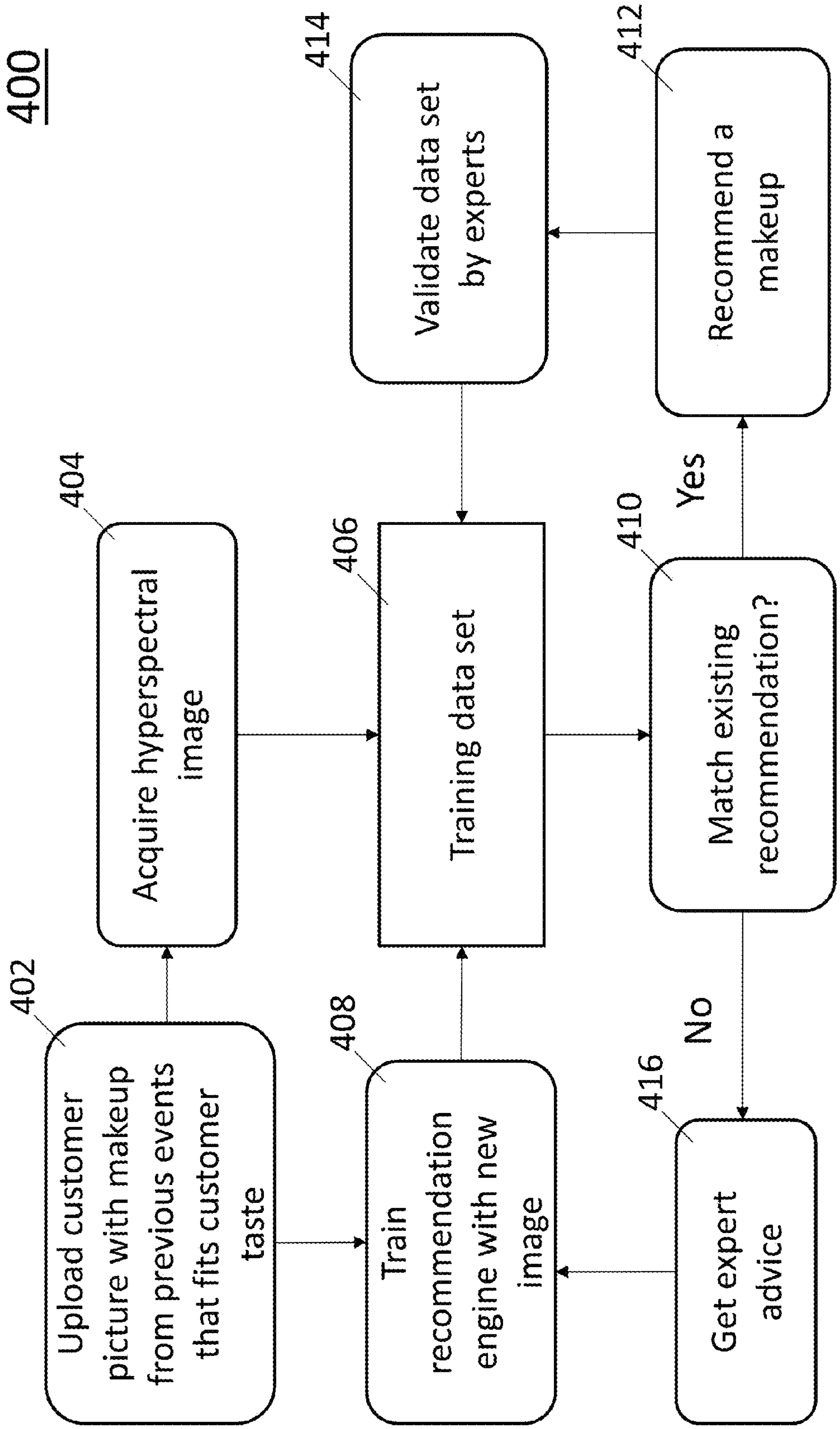
FIG. 4 is an operational flow diagram illustrating one process of matching hyperspectral images with training set data to recommend a cosmetic according to one embodiment of the present disclosure.

During the cognitive phase, the cosmetics recommendation system 100 associates and correlates HSI data, expert opinions and images of faces using certain cosmetic products and/or their components. Referring to FIG. 4, a flow diagram 400 is provided which illustrates a process for the cosmetics recommendation system 100 to be trained to correlate data and recommend cosmetics for a particular customer. Using sparse regression, the cosmetics recommendation system 100 maps the measures gathered during the data acquisition phase together with cosmetic mixtures to a standard color space, such as a color wheel. The sparse feature matrix is learned by the cosmetics recommendation system 100 for multiple users and applied for the given user to the problem of assisting him or her to choose a set of cosmetics and application techniques.

Beginning at step 402, a picture of the particular customer wearing make-up from a previous event in which the customer finds their appearance appealing is uploaded along with available information related to that picture (e.g., type of event, season, cosmetic type, etc.). A hyperspectral image is acquired from the picture, at step 404, using the HSI camera 102. The HSI data and related information are added to the training data set, at step 406, and the recommendation engine 111 is trained using the new data, at step 408. If a recommendation matching the new data currently exists, at step 410, a make-up product is recommended for the customer, at step 412, and the new data set is validated, at step 414, by experts, such as retail store cosmeticians. If there is no current recommendation matching the new data, at step 410, expert advice is obtained, at step 416, and the expert advice is added to the training data set and used to continue training the recommendation engine 111.

Continuous Utilization Stage

Figure 5:
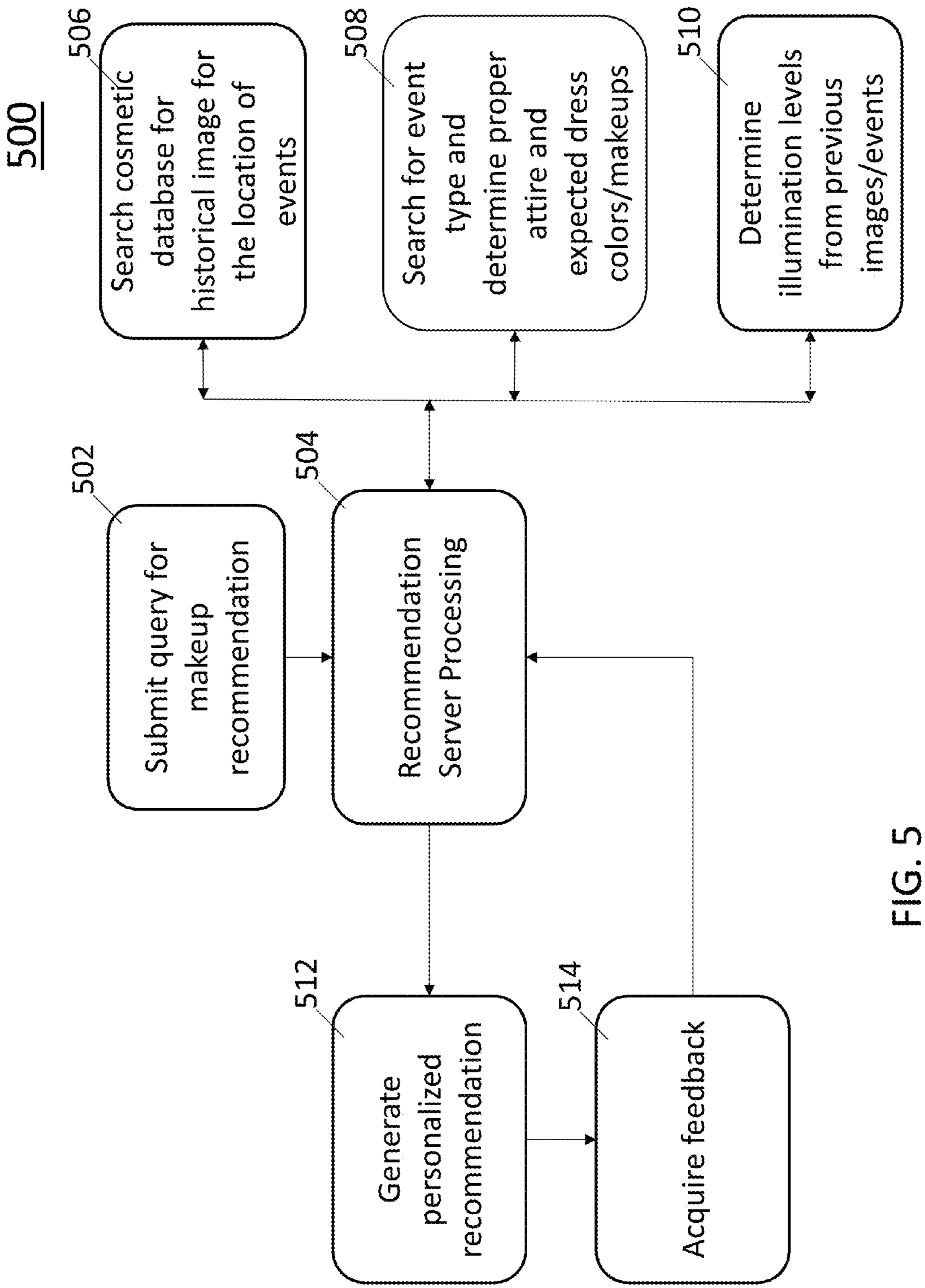
FIG. 5 is an operational flow diagram illustrating one process of recommending a cosmetic using an expert system according to one embodiment of the present disclosure.

Referring to FIG. 5, a flow diagram 500 illustrates an example process for continuous utilization of the cosmetics recommendation system 100. The continuous utilization phase includes retrieving information generated by the cosmetics recommendation system 100 and generating a targeted cosmetic product for a particular customer. The continuous utilization phase also involves providing advice for incidental changes of the customer's cosmetic and wardrobe palette. This phase allows customers to continuously receive advice based on an upgradable customer personal file and communication, for example, via mobile phone or tablet acting as a client computer 104. For example, a customer may send a message query to the cosmetics recommendation system 100 which includes an identifier (ID) and a planned social activity or event, such as location description, time of the day, mood, expectations, etc. Furthermore, the customer sends a picture of planned attire taken by cellular phone. The query may also include an educated guess for make-up at her disposal, attire and accessory palette.

Beginning at step 502, the client computer 104 submits a query for a make-up recommendation. In a similar fashion as discussed above, the query may include personal information about the customer, including a unique identifier associated with the customer, images taken using the HSI camera 102, information relating to an event that the customer will be attending (e.g., event type, location, etc.), data about environmental factors relating to the event (e.g., time, date, lighting factors, etc.), and so on. The query is received at the recommendation server 108, at step 504, which begins processing the query. Processing includes identifying prior matches corresponding to the data received in the query and recommending a cosmetic product based on the query. For example, the recommendation engine 111 may search the cosmetic database 112 for historical hyperspectral images that correspond to the location of the event from the query, at step 506. In addition, the recommendation engine 111 may also search for the event type to determine proper attire and expected dress coloring and make-up for that particular event, at step 508. The recommendation engine 111 may also determine illumination levels, at step 510, from previous similar images and events. If similar conditions may not be met, the recommendation engine 111 may simulate the illumination level based on expected event type and adjust previous recommendation based on the change in perceived makeup color under expected illumination level. The recommendation engine 111 uses the information retrieved from the searches of step 506, 508 and 510 to generate a personalized recommendation for the customer identified in the original query, at step 512. The customer may provide feedback information, at step 514, indicating a satisfaction rating with the recommended cosmetics.

Customer provided recommendation can be the level of contrast between applied cosmetics and color of skin, hair or eyes. The recommendation can be either high contrast in some part of the face or low contrast. The hyperspectral images of the face and the color recommendations can be used to minimize or maximize the contrast across a part of the face.

In one embodiment, prior to use of the trained cosmetics recommendation system 100 described above, a cosmetician may be presented with an artificial context of a color wheel (or other color presentation) on device such as a hand held touch screen or heads up display, to select a color or colors that the cosmetician likes to use on a certain category of face, as described above.

This selection allows the cosmetics recommendation system 100 to fit a mathematical model 116, such as a linear model, to data where the number of observations (i.e. observations of cosmetics purchases followed by either approval or disapproval ratings on the resulting color) to variables (i.e. measures of a user's perceptual/cognitive/environmental (P/C/E) context, and the cosmetician's system determined indicated target color in the artificial context of the color wheel, collected at the time the original system was trained). The cosmetics recommendation system 100 selects a color from the color wheel, and using the previously learned sparse regression model, maps the selection, together with the user's P/C/E back to the cosmetics space, where it is presumed the cosmetics will produce the desired color in order to minimize returns and dissatisfaction with the outcome. Thus, the cosmetics recommendation system 100 ensures that the user's P/C/E context creates a qualitative experience of the chosen and desired color, since sparse regression is designed to fit all of the user's P/C/E inputs and all available cosmetics to the space of desired colors.

Information Processing System

Figure 6:
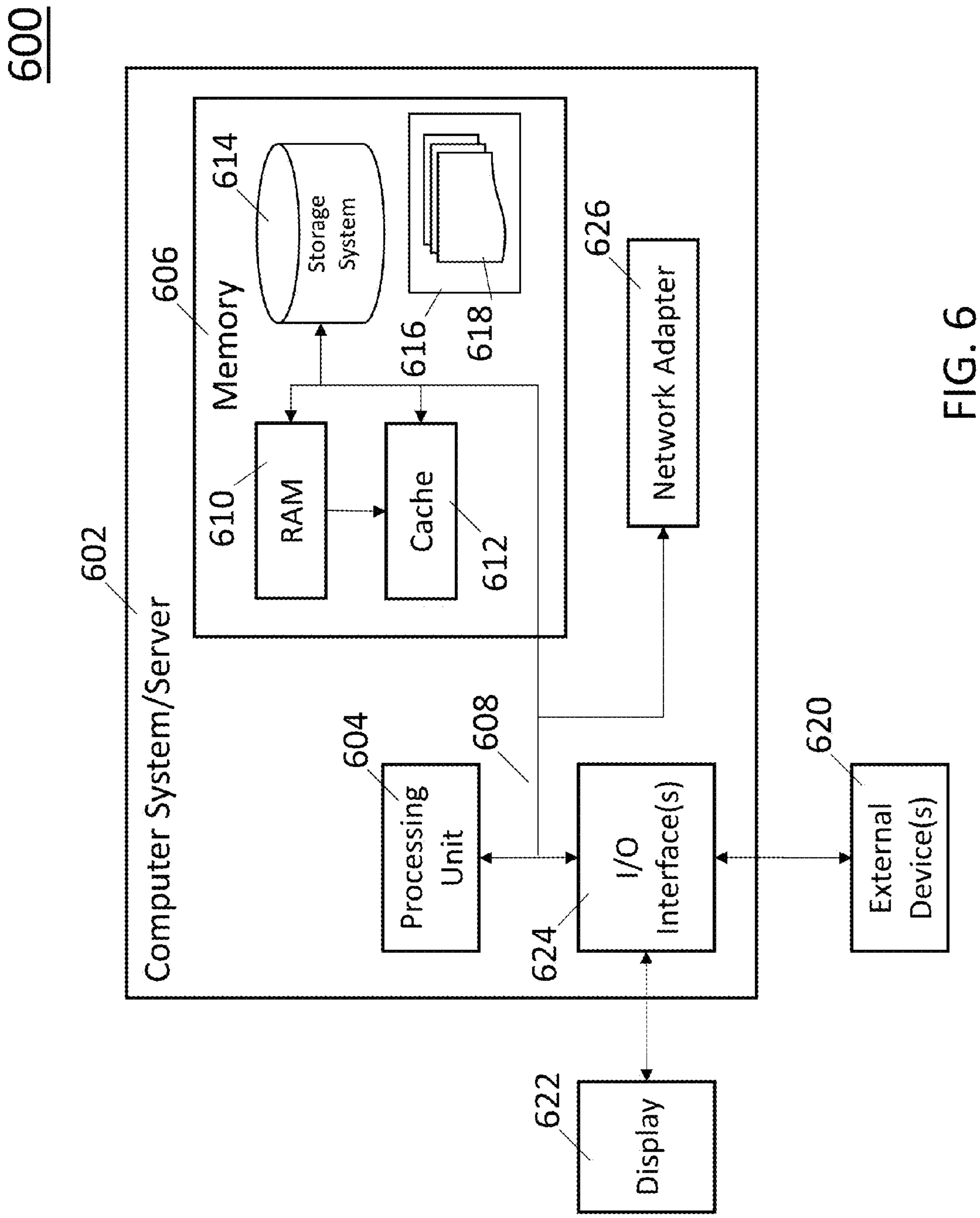
FIG. 6 is a block diagram illustrating one example of an information processing system according to one embodiment of the present disclosure.

Referring now to FIG. 6, this figure is a block diagram illustrating an information processing system that can be utilized in embodiments of the present disclosure. The information processing system 602 is based upon a suitably configured processing system configured to implement one or more embodiments of the present disclosure (e.g., recommendation server 108). Any suitably configured processing system can be used as the information processing system 602 in embodiments of the present disclosure. The components of the information processing system 602 can include, but are not limited to, one or more processors or processing units 804, a system memory 606, and a bus 608 that couples various system components including the system memory 606 to the processor 604.

The bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 6, the main memory 606 includes the image matcher 110, and recommendation engine 111 and their components, and the various types of data 114, 116, 118, 120, 122, 124, 126, 128, 130, 132, shown in FIG. 1. One or more of these components can reside within the processor 604, or be a separate hardware component. The system memory 606 can also include computer system readable media in the form of volatile memory, such as random access memory (RAM) 610 and/or cache memory 612. The information processing system 602 can further include other removable/non-removable, volatile/non-volatile computer system storage media. By way of example only, a storage system 614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 808 by one or more data media interfaces. The memory 606 can include at least one program product having a set of program modules that are configured to carry out the functions of an embodiment of the present disclosure.

Program/utility 616, having a set of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of embodiments of the present disclosure.

The information processing system 602 can also communicate with one or more external devices 620 such as a keyboard, a pointing device, a display 622, etc.; one or more devices that enable a user to interact with the information processing system 602; and/or any devices (e.g., network card, modem, etc.) that enable computer system/server 602 to communicate with one or more other computing devices. Such communication can occur via I/O interfaces 624. Still yet, the information processing system 602 can communicate with one or more networks such as a local area network (LAN), a general wide area network (WAN), and/or a public network (e.g., the Internet) via network adapter 626. As depicted, the network adapter 626 communicates with the other components of information processing system 602 via the bus 608. Other hardware and/or software components can also be used in conjunction with the information processing system 602. Examples include, but are not limited to: microcode, device drivers, redundant processing units, external disk drive arrays, RAID systems, tape drives, and data archival storage systems.

Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing a customized cosmetics recommendation, the method comprising:

capturing an image including a face of a specific user using a hyperspectral imaging camera;

producing a hypercube from the captured image using at least 20 different filters, the hypercube comprising at least 20 different hyperspectral images, each hyperspectral image resulting from a different filter;

analyzing the hyperspectral images to determine a set of spectral components of the face, wherein each hyperspectral image is a different wavelength filtered version of the captured image such that the spectral components of the face comprise a narrow wavelength interval where the full width at half maximum wavelength is 4 to 15 nanometers;

mapping each set of the plurality of previous sets of spectral components along with a set of demographic data to one or more cosmetics based on expert opinion; and providing a recommendation for one or more cosmetics customized for the specific user based on the set of spectral components and an historical cosmetics database comprising spectral components of a plurality of previous sets of spectral components mapped to a set of one or more cosmetics using cosmetician expert judgement of a plurality of cosmeticians.

2. The method of claim 1, wherein providing the recommendation for one or more cosmetics comprises:

comparing the set of spectral components to the plurality of previous sets of spectral components to find a match; and providing the one or more cosmetics mapped to the match as the recommendation.

3. The method of claim 1, further comprising mapping each set of the plurality of previous sets of spectral components along with each set of a plurality of sets of conditional options to one or more cosmetics based on expert opinion.

4. The method of claim 3, further comprising:

receiving a set of conditional options;

comparing the set of spectral components and the received set of conditional options to each set of the plurality of previous sets of spectral components along with each set of the plurality of sets of conditional options to find a match; and providing the one or more cosmetics mapped to the match as the recommendation.

5. The method of claim 3, wherein each set of the plurality of conditional options comprises one or more of customer selections, fashion data, regional data, feature data and environmental data.

6. The method of claim 3, further comprising updating the mapping using at least one of user feedback and social media polling.

7. The method of claim 3, wherein providing the recommendation for one or more cosmetics comprises:

simulating use of the recommended one or more cosmetics on the face of the image; and displaying the simulated image.

8. An information processing system for providing a customized cosmetics recommendation, the information processing system comprising:

a memory;

a processor operably coupled to the memory; and a recommendation engine operably coupled to the memory and the processor, the recommendation engine configured to perform a method comprising:

capturing an image including a face of a specific user using a hyperspectral imaging camera;

producing a hypercube from the captured image using at least 20 different filters, the hypercube comprising at least 20 different hyperspectral images, each hyperspectral image resulting from a different filter;

analyzing the hyperspectral images to determine a set of spectral components of the face, wherein each hyperspectral image is a different wavelength filtered version of the captured image such that the spectral components of the face comprise a narrow wavelength interval where the full width at half maximum wavelength is 4 to 15 nanometers;

mapping each set of the plurality of previous sets of spectral components along with a set of demographic data to one or more cosmetics based on expert opinion; and providing a recommendation for one or more cosmetics customized for the specific user based on the set of spectral components and an historical cosmetics database comprising spectral components of a plurality of previous sets of spectral components mapped to a set of one or more cosmetics using cosmetician expert judgement of a plurality of cosmeticians.

9. The information processing system of claim 8, further comprising:

a database storing the plurality of previous sets of spectral components and a plurality of sets of one or more cosmetics, each set of the plurality of sets of one or more cosmetics mapped to a previous set of spectral components based on expert opinion.

10. The information processing system of claim 9, wherein providing the recommendation for one or more cosmetics comprises:

comparing the set of spectral components to the plurality of previous sets of spectral components to find a match; and providing the one or more cosmetics mapped to the match as the recommendation.

11. The information processing system of claim 10, wherein the database further stores a plurality of sets of conditional options, each set of the plurality of sets of conditional options along with each set of the plurality of previous sets of spectral components mapped to one or more cosmetics based on expert opinion, the method further comprises:

receiving a set of conditional options;

comparing the set of spectral components and the received set of conditional options to each set of the plurality of previous sets of spectral components along with each set of the plurality of sets of conditional options to find a match; and providing the one or more cosmetics mapped to the match as the recommendation.

12. The information processing system of claim 11, wherein each set of the plurality of conditional options comprises one or more of customer selections, fashion data, regional data, feature data and environmental data.

13. The information processing system of claim 11, further comprising updating the mapping using at least one of user feedback and social media polling.

14. The information processing system of claim 11, wherein providing the recommendation for one or more cosmetics comprises:

simulating use of the recommended one or more cosmetics on the face of the image; and displaying the simulated image.

15. A computer program product for providing a customized cosmetics recommendation, the computer program product comprising:

a storage medium readable by a processing circuit and storing instructions for execution by the processing circuit for performing a method comprising:

capturing an image including a face of a specific user using a hyperspectral imaging camera;

producing a hypercube from the captured image using at least 20 different filters, the hypercube comprising at least 20 different hyperspectral images, each hyperspectral image resulting from a different filter;

analyzing the hyperspectral images to determine a set of spectral components of the face, wherein each hyperspectral image is a different wavelength filtered version of the captured image such that the spectral components of the face comprise a narrow wavelength interval where the full width at half maximum wavelength is 4 to 15 nanometers;

mapping each set of the plurality of previous sets of spectral components along with a set of demographic data to one or more cosmetics based on expert opinion; and providing a recommendation for one or more cosmetics customized for the specific user based on the set of spectral components and an historical cosmetics database comprising spectral components of a plurality of previous sets of spectral components mapped to a set of one or more cosmetics using cosmetician expert judgement of a plurality of cosmeticians.

16. The computer program product of claim 15, wherein the method further comprises mapping each set of the plurality of previous sets of spectral components along with each set of a plurality of sets of conditional options to one or more cosmetics based on expert opinion.

17. The computer program product of claim 15, wherein the method further comprises:

receiving a set of conditional options;

comparing the set of spectral components and the received set of conditional options to each set of the plurality of previous sets of spectral components along with each set of the plurality of sets of conditional options to find a match; and providing the one or more cosmetics mapped to the match as the recommendation.

18. The information processing system of claim 8, wherein each set of hyperspectral images from the image comprises at least 20 images.

19. The computer program product of claim 16, wherein each set of hyperspectral images from the image comprises at least 20 images.

* * * * *